US012480522B2

(12) United States Patent
Ishii et al.

(10) Patent No.: US 12,480,522 B2
(45) Date of Patent: Nov. 25, 2025

(54) CENTRIFUGAL BLOWER

(71) Applicant: DENSO CORPORATION, Kariya (JP)

(72) Inventors: Fumiya Ishii, Kariya (JP); Jun Yamaoka, Kariya (JP); Mari Fukada, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 0 days.

(21) Appl. No.: 18/794,485

(22) Filed: Aug. 5, 2024

(65) Prior Publication Data

US 2024/0392800 A1 Nov. 28, 2024

Related U.S. Application Data

(63) Continuation of application No. PCT/JP2023/001323, filed on Jan. 18, 2023.

(30) Foreign Application Priority Data

Feb. 8, 2022 (JP) ................................ 2022-018149

(51) Int. Cl.
*F04D 29/28* (2006.01)
*F04D 29/42* (2006.01)

(52) U.S. Cl.
CPC ....... *F04D 29/281* (2013.01); *F04D 29/4226* (2013.01); *F05D 2240/303* (2013.01)

(58) Field of Classification Search
CPC .............................. F04D 29/281; F04D 29/30
See application file for complete search history.

(56) References Cited

U.S. PATENT DOCUMENTS

| | | | | |
|---|---|---|---|---|
| 7,281,897 | B2 * | 10/2007 | Ochiai | F04D 29/30 416/187 |
| 10,294,953 | B2 * | 5/2019 | Kamiya | H02K 7/003 |
| 11,300,134 | B2 * | 4/2022 | Umematsu | F04D 29/4233 |
| 11,401,944 | B2 * | 8/2022 | Yamashita | F04D 29/284 |
| 2016/0305435 | A1 | 10/2016 | Kamiya et al. | |
| 2021/0301831 | A1 | 9/2021 | Yamashita et al. | |
| 2022/0003243 | A1 | 1/2022 | Imahigashi et al. | |

FOREIGN PATENT DOCUMENTS

| | | | |
|---|---|---|---|
| JP | S59175696 | U | 11/1984 |
| JP | H11183602 | A | 7/1999 |
| JP | 200427892 | A | 1/2004 |

(Continued)

*Primary Examiner* — Justin D Seabe
(74) *Attorney, Agent, or Firm* — Harness, Dickey & Pierce, P.L.C.

(57) ABSTRACT

A centrifugal blower includes a case, an electric motor supported by the case at a motor support position, and a fan driven by the electric motor. The fan includes: a boss installed to an output shaft; a main plate extending outward from the boss in a radial direction; a plurality of blades extending from the main plate toward one side in an axial direction; and a side plate joined to an end portion of each of the plurality of blades, which faces the one side in the axial direction. A weight of the main plate is larger than a weight of the side plate. The main plate and the side plate are both inclined toward another side opposite to the one side in the axial direction as the main plate and the side plate approach an outer side in the radial direction.

16 Claims, 10 Drawing Sheets

(56) References Cited

FOREIGN PATENT DOCUMENTS

| | | | | | |
|---|---|---|---|---|---|
| JP | 201053815 | A | | 3/2010 | |
| JP | 2010281256 | A | | 12/2010 | |
| JP | 2015175279 | A | | 10/2015 | |
| JP | 2020180588 | A | | 11/2020 | |
| JP | 2021156223 | A | | 10/2021 | |
| WO | WO-2021095679 | A1 | * | 5/2021 | ............ F04D 29/44 |

* cited by examiner

CENTRIFUGAL BLOWER

CROSS REFERENCE TO RELATED APPLICATIONS

This application is a continuation application of International Patent Application No. PCT/JP2023/001323 filed on Jan. 18, 2023, which designated the U.S. and claims the benefit of priority from Japanese Patent Application No. 2022-018149 filed on Feb. 8, 2022. The entire disclosures of all of the above applications are incorporated herein by reference.

TECHNICAL FIELD

The present disclosure relates to a centrifugal blower.

BACKGROUND

Previously, there is a need to reduce an axial distance measured in a direction parallel to a rotational axis of an impeller from a perpendicular plane, which passes through a joint between a boss and a main plate of the impeller and is perpendicular to the rotational axis, to a center of gravity of the impeller in a turbofan. In order to meet this need, there has been proposed a technique of forming the main plate such that a plate thickness of the main plate is progressively increased from the rotational axis side to an outer periphery of the main plate.

SUMMARY

This section provides a general summary of the disclosure, and is not a comprehensive disclosure of its full scope or all of its features.

According to the present disclosure, there is provided a centrifugal blower that includes a case, an electric motor and a fan. The electric motor is supported by the case. The fan is configured to be driven by the electric motor. The fan includes a boss, a main plate, a plurality of blades and a side plate. The boss is installed to an output shaft of the electric motor. The main plate extends outward from the boss in a radial direction of a central axis of the output shaft. The plurality of blades extend from the main plate toward one side in an axial direction of the output shaft. The side plate is joined to an end portion of each of the plurality of blades which faces the one side in the axial direction. A weight of the main plate is larger than a weight of the side plate. The main plate and the side plate are both inclined toward another side opposite to the one side in the axial direction of the output shaft as the main plate and the side plate approach an outer side in the radial direction.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
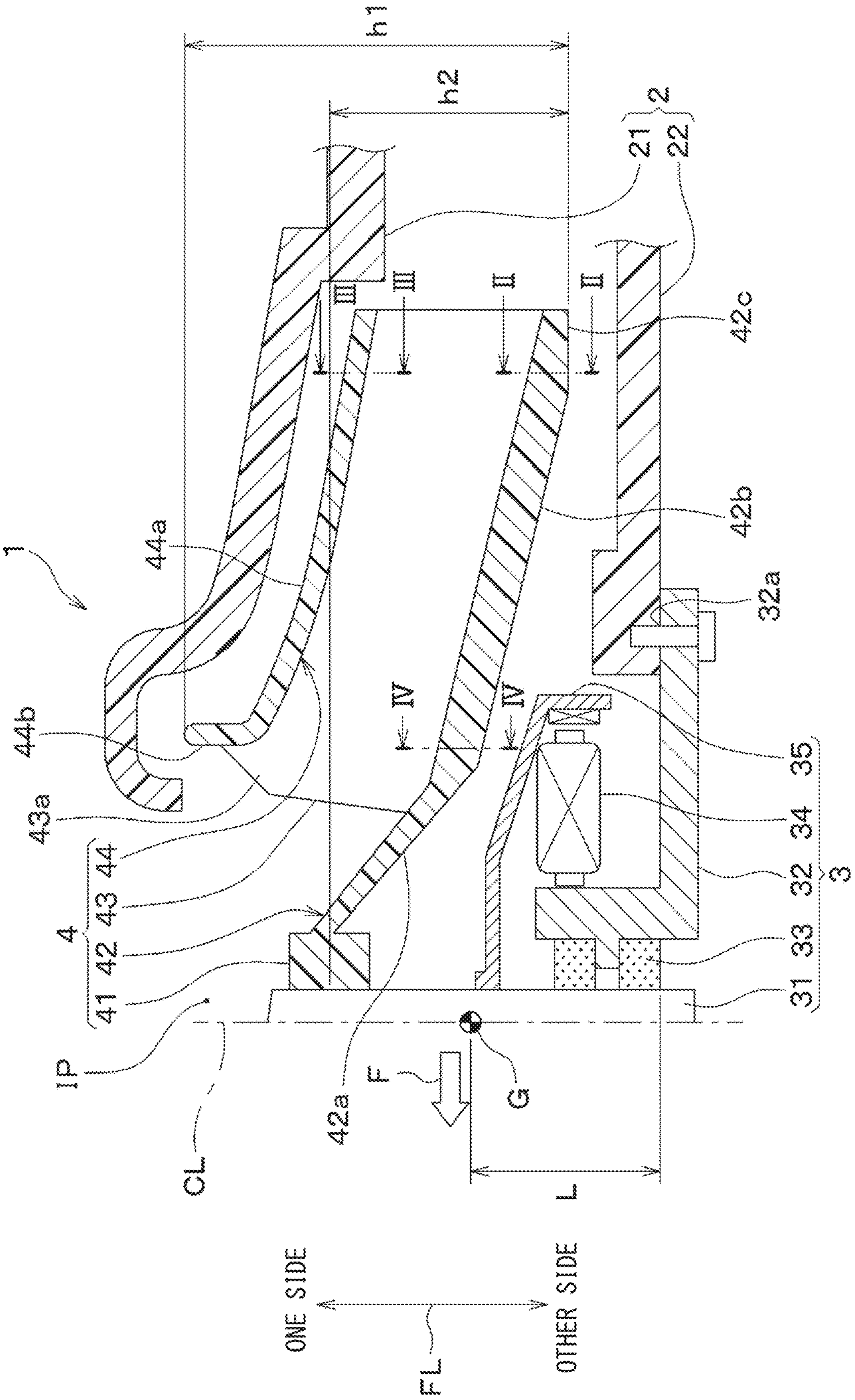
FIG. 1 is a cross-sectional view of a centrifugal blower of a first embodiment taken along a plane including a rotational axis of the centrifugal blower.

Previously, there is a need to reduce an axial distance measured in a direction parallel to a rotational axis of an impeller from a perpendicular plane, which passes through a joint between a boss and a main plate of the impeller and is perpendicular to the rotational axis, to a center of gravity of the impeller in a turbofan. In order to meet this need, there has been proposed a technique of forming the main plate such that a plate thickness of the main plate is progressively increased from the rotational axis side to an outer periphery of the main plate.

According to the study of the inventors of the present application, it is desirable to reduce the amount of positional deviation which is measured in an axial direction of the rotational axis between the center of gravity of the impeller and a motor support position that is a position where an electric motor is supported by a case in the turbofan described above. This is because when the amount of positional deviation is increased, it will increase a momentum around the motor support position in response to a centrifugal force induced by a complex imbalance of the fan and a motor rotor, thereby possibly insufficiently limiting vibrations of the turbofan. This is true not only for the turbofan but also for a centrifugal blower in general.

According to one aspect of the present disclosure, there is provided a centrifugal blower including:

a case;

an electric motor that is supported by the case at a motor support position of the electric motor; and a fan that is configured to be driven and rotated by the electric motor, wherein:

the fan includes:

- a boss that is installed to an output shaft of the electric motor at a location which is on one side relative to the motor support position in an axial direction of the output shaft;
- a main plate that extends outward from the boss in a radial direction of a central axis of the output shaft;
- a plurality of blades that extend from the main plate toward the one side in the axial direction of the output shaft; and a side plate that is joined to an end portion of each of the plurality of blades which faces the one side in the axial direction of the output shaft, wherein:

a weight of the main plate is larger than a weight of the side plate; and the main plate and the side plate are both inclined toward another side opposite to the one side in the axial direction of the output shaft as the main plate and the side plate approach an outer side in the radial direction.

Since the weight of the main plate placed on the another side relative to the side plate in the axial direction of the output shaft is larger than the weight of the side plate, it is possible to reduce the amount of positional deviation measured between the motor support position and the center of gravity of the fan in the axial direction of the output shaft. Furthermore, since the main plate and the side plate are both inclined toward the another side in the axial direction of the output shaft as the main plate and the side plate approach the outer side in the radial direction, the plurality of blades can be displaced toward the another side in the axial direction of the output shaft, so that the center of gravity of the fan can be displaced toward the another side in the axial direction. That is, it is possible to reduce the amount of positional deviation measured between the motor support position and the center of gravity of the fan in the axial direction of the output shaft.

Hereinafter, embodiments of the present disclosure will be described. In the following embodiments, the same reference signs may be assigned to portions that are the same as or equivalent to those described in the preceding embodiment(s), and the description thereof may be omitted. Furthermore, when only one or more of the components are described in the embodiment, the description of the rest of the components in the preceding embodiment can be applied to the rest of the components. The following embodiments may be partially combined with each other as long as the combination does not cause any trouble, even if not explicitly stated.

First Embodiment

As shown in FIG. 1, a centrifugal blower 1 of a first embodiment includes: a case 2; an electric motor 3 which is supported by the case 2; and a fan 4 which is driven and is rotated by the electric motor 3. FIG. 1 is a cross-sectional view of the centrifugal blower 1 taken along a plane including a rotational axis CL of the centrifugal blower 1. The centrifugal blower 1 of the present embodiment is a turbofan, but as another example, a centrifugal blower other than the turbofan (e.g., a sirocco fan) may be used.

The case 2 is a member that receives the electric motor 3 and the fan 4. The case 2 is made of, for example, resin but may be made of any one of other suitable materials. The case 2 may be attached to another member (e.g., a housing that forms an outer shell of an air conditioning device).

The case 2 includes a first case section 21 and a second case section 22. The first case section 21 and the second case section 22 may be formed separately and assembled together, or the first case section 21 and the second case section 22 may be formed integrally in one-piece. The first case section 21 covers a suction side of the fan 4, and the second case section 22 covers an opposite side of the fan 4, which is opposite to the suction side, and the electric motor 3 is installed to the second case section 22.

The electric motor 3 includes an output shaft 31, a rotatable body holder 32, a bearing 33, a core 34 and a rotor 35. The electric motor 3 is an outer rotor electric motor but may be an inner rotor electric motor as another example.

The output shaft 31 is a rod that transmits a rotational force, which is generated by the electric motor 3, to the fan 4. A central axis of the output shaft 31 and the rotational axis CL are substantially coaxial with each other. The rotatable body holder 32 is a member made of, for example, metal or resin. The rotatable body holder 32 is securely installed to the second case section 22 at a motor support position **32*a* of the rotatable body holder 32. The secure installation of the rotatable body holder 32 to the second case section 22 may be implemented by fastening of the rotatable body holder 32 to the second case section 22** by bolts or screws or any other means.

The motor support position **32*a* is located on an outer side relative to an outermost periphery of the rotor 35 in a radial direction of the central axis of the output shaft 31. Furthermore, the motor support position 32*a* is placed on the outer side relative to a position of a connection between a boss 41 (described later) and the output shaft 31 in the radial direction of the central axis of the output shaft 31. Furthermore, the motor support position 32*a* is placed on a lower side in FIG. 1 in an extending direction of the output shaft 31 relative to the position of the connection between the boss 41 and the output shaft 31 and also a position of a connection between the rotor 35 and the output shaft 31**.

Hereinafter, the extending direction of the output shaft 31 will be referred to as an axial direction FL. Furthermore, an upper side in FIG. 1 in the axial direction FL will be referred to as one side, and a lower side in FIG. 1 in the axial direction FL will be referred to as the other side. Also, a radial direction of the central axis of the output shaft 31 will be simply referred to as a radial direction, and a circumferential direction about the central axis of the output shaft 31 will be simply referred to as a circumferential direction.

The bearing 33 is installed to a surface of the rotatable body holder 32 which faces the output shaft 31, and the bearing 33 rotatably supports the output shaft 31. With the configuration described above, the rotatable body holder 32 holds the output shaft 31, the rotor 35 and the fan 4 through the bearing 33.

The core 34 generates a magnetic field in response to energization of the core 34 to drive and rotate the rotor 35. The core 34 is fixed to the rotatable body holder 32. The rotatable body holder 32 and the core 34 form a stator.

The rotor 35 is fixed to the output shaft 31 at an inner periphery of the rotor 35 which faces an inner side in the radial direction, and an outer periphery of the rotor 35, which faces the outer side in the radial direction, is placed on the outer side relative to the core 34 in the radial direction. The rotor 35 includes magnets. The magnets are placed on the outer side relative to the core 34 in the radial direction. The rotor 35 receives a rotational force from the magnetic field generated from the core 34 through the action of the magnets. In the electric motor 3, the magnetic field is generated in response to the energization of the core 34, and the rotor 35 is rotated integrally with the output shaft 31 by the magnetic field. At this time, the output shaft 31 is rotatably supported by the bearing 33.

The fan 4 includes the boss 41, a main plate 42, a plurality of blades 43 and a side plate 44. In the present embodiment, the boss 41, the main plate 42, the blades 43 and the side plate 44 are made of a common material (e.g., resin) as a whole and are molded integrally in one-piece. Furthermore, a mass density of the fan 4 is uniform. The boss 41 is a member shaped in a ring form and is installed to the output shaft 31. Furthermore, the position of the connection between the boss 41 and the output shaft 31 is placed on the one side in the axial direction FL relative to the position of the connection between the rotor 35 and the output shaft 31 and also the motor support position 32*a*.

The main plate 42 is a member shaped in a plate form. The main plate 42 is joined to the boss 41 at an inner periphery of the main plate 42 facing the inner side in the radial direction of the central axis of the output shaft 31 and extends from the boss 41 toward the outer side in the radial direction. Each of the blades 43 is a member shaped in a plate form. Each blade 43 extends toward the one side in the axial direction FL from a surface of the main plate 42 facing the one side in the axial direction FL and is joined to the side plate 44 at an end portion of the blade 43 facing the one side in the axial direction FL. The blades 43 are arranged in the circumferential direction about the central axis of the output shaft 31. Each blade 43 extends such that the further away from the output shaft 31, the more the blade 43 is displaced toward a rear side in a rotational direction of the fan 4. The rotational direction coincides with the circumferential direction.

The side plate 44 is a member that is shaped in a plate form. The side plate 44 surrounds the output shaft 31 and extends toward the outer side in the radial direction. As described above, the blades 43 are joined to the surface of the side plate 44 which faces the other side in the axial direction FL. Furthermore, the first case section 21 is opposed to a surface of the side plate 44 facing the one side in the axial direction FL and covers the side plate 44 from the one side in the axial direction FL.

The side plate 44 has a main body 44*a* and a tubular portion 44*b*. The main body 44*a* is opposed to the main plate 42 and holds the blades 43 between the main plate 42 and the main body 44*a*. The tubular portion 44*b* is shaped in a tubular form and extends from an inner peripheral end portion of the main body 44*a* facing the inner side in the radial direction and extends toward the one side in the axial direction FL while the tubular portion 44*b* is bent relative to the main body 44*a*. The tubular portion 44*b* is opposed to the output shaft 31 and surrounds the output shaft 31 to form a suction port IP for suctioning the air on the inner side relative to the tubular portion 44*b* in the radial direction.

The boss 41, the main plate 42, the blades 43 and the side plate 44, which are configured in the above-described manner, are rotated integrally when the rotational force is transmitted from the output shaft 31. Therefore, the output shaft 31, the rotor 35 and the fan 4 are integrally rotated toward a front side in the rotational direction.

Next, an operation of the centrifugal blower 1 configured in the above-described manner will be described. When the core 34 of the electric motor 3 is energized, the core 34 generates a magnetic force, and the rotor 35 is driven and rotated by this magnetic force. Therefore, the rotor 35, the output shaft 31 and the fan 4 are integrally rotated. Thus, the airflow is suctioned into the suction port IP from the one side toward the other side in the axial direction FL and then flows from the inner side toward the outer side in the radial direction between the main plate 42 and the side plate 44 through each passage defined between corresponding adjacent two of the blades 43 and is discharged from an outermost periphery of the fan 4 toward the outer side in the radial direction.

In the centrifugal blower 1, there is a complex imbalance of the fan 4 and the rotor 35. This imbalance is caused by the fact that the mass of the rotatable body around the rotational axis is not uniformly distributed in the circumferential direction (for example, due to eccentricity). Here, the rotatable body is formed by the fan 4 and the rotor 35. A momentum around the motor support position 32*a* generated by a centrifugal force F due to this imbalance causes vibrations of the centrifugal blower 1. When this momentum is increased, the vibrations of the centrifugal blower 1 may not be sufficiently limited. Furthermore, this momentum is increased when the amount L of positional deviation measured in the axial direction FL between the motor support position 32*a* and a center G of gravity of the fan 4 is increased. The centrifugal blower 1 of the present embodiment is configured to limit the amount L of positional deviation.

The characteristic features of this centrifugal blower 1 will be described in further detail. First, the main plate 42 and the side plate 44 are both inclined toward the other side in the axial direction FL as the main plate 42 and the side plate 44 approach the outer side in the radial direction. That is, each of the main plate 42 and the side plate 44 extends toward the other side in the axial direction FL as each of the main plate 42 and the side plate 44 approaches the outer side in the radial direction.

With the configuration described above, the blades 43 can be displaced toward the other side in the axial direction FL, so that the center G of gravity of the fan 4 can be displaced toward the other side in the axial direction FL. Therefore, the amount L of positional deviation can be limited, and thereby the vibrations of the centrifugal blower 1 caused by the imbalance can be limited.

Furthermore, a weight of the main plate 42 is larger than a weight of the side plate 44. With this, the center G of gravity of the fan 4 can be placed closer to the main plate 42, and thereby the center G of gravity can be displaced toward the other side in the axial direction FL to reduce the amount L of positional deviation.

(1) Specifically, a plate thickness of the main plate 42 is larger than a plate thickness of the side plate 44. This comparison is obvious in a case where the plate thickness of the main plate 42 and the plate thickness of the side plate 44 are uniform. If this is not a case, then the comparison is made based on an average plate thickness of the main plate 42 and an average plate thickness of the side plate 44. The average plate thickness is a value that is obtained by dividing a volume of the plate by a surface area of a plate surface of the plate.

By implementing the difference between the plate thickness of the main plate 42 and the plate thickness of the side plate 44 in the above-described manner, it is possible to reduce the amount of positional deviation measured between the motor support position and the center of gravity of the fan in the axial direction of the output shaft.

(2) Furthermore, a length h1 is defined as a length which is axially measured from an end of the fan 4 facing the one side in the axial direction FL to another end of the fan 4 facing the other side in the axial direction FL. This length h1 is also referred to as a total height of the fan 4. In addition, a length h2 is defined as a length which is axially measured from a position of a connection between the boss 41 and the output shaft 31 to the other end of the fan 4 facing the other side in the axial direction FL. The length h2 is also referred to as a height of the boss 41. In this case, the length h2 is equal to or larger than one half of the length h1.

Therefore, a gradient of an inclination of the main plate 42, which is joined to the boss 41 and is inclined as discussed above, can be made steeper, and thereby with respect to the total height of the fan 4, the blades 43 can be further displaced toward the other side in the axial direction FL. Consequently, the amount L of positional deviation can be reduced.

(3) Furthermore, the main plate 42 has a first slope portion 42*a* and a second slope portion 42*b*. At the main plate 42, the first slope portion 42*a* is placed on the inner side relative to the second slope portion 42*b* in the radial direction. Furthermore, an end of the first slope portion 42*a*, which faces the inner side in the radial direction, is joined to the boss 41.

The first slope portion 42*a* has a gradient of an inclination that is inclined toward the other side in the axial direction FL as the first slope portion 42*a* approaches the outer side in the radial direction, and the gradient of the inclination of the first slope portion 42*a* is within a first range. This gradient is an amount that gets larger when the amount of displacement toward the other side in the axial direction FL gets larger in a case where a distance from the output shaft 31 is increased by a unit length. Specifically, this is a depression angle. Furthermore, the gradient is specified based on a position of a midpoint between an end of the slope portion facing the one side in the axial direction FL and an end of the slope portion facing the other side in the axial direction FL.

The second slope portion 42*b* has a gradient of an inclination that is inclined toward the other side in the axial direction FL as the second slope portion 42*b* approaches the outer side in the radial direction, and the gradient of the inclination of the second slope portion 42*b* is within a second range that is different from the first range. The first range and the second range may overlap in part, or the first range and the second range may not overlap at all. This allows for more flexibility in devising ways to reduce the amount L of positional deviation compared to the case where the gradient of the main plate 42 is constant along its entire extent.

(4) Furthermore, the first range is steeper than the second range. In other words, an upper limit of the first range of the gradient is larger than an upper limit of the second range of the gradient, and a lower limit of the first range is larger than a lower limit of the second range. Furthermore, an average of the upper and lower limits of the first range is larger than an average of the upper and lower limits of the second range.

With this configuration, the second slope portion 42*b*, which may be more voluminous because the second slope portion 42*b* is placed radially outward of the first slope portion 42*a*, can be disposed more on the other side in the axial direction FL. Consequently, the amount L of positional deviation can be reduced.

(5) Furthermore, an average plate thickness of the second slope portion 42*b* is larger than an average plate thickness of the first slope portion 42*a*. By increasing the average plate thickness of the second slope portion 42*b*, which is placed closer to the other side in the axial direction FL among the first slope portion 42*a* and the second slope portion 42*b* at the main plate 42, the amount L of positional deviation can be effectively reduced.

Here, although the average plate thickness of the second slope portion 42*b* is larger than an average plate thickness of the side plate 44 in the present embodiment, the average plate thickness of the second slope portion 42*b* may not be larger than the average plate thickness of the side plate 44 in another example. Furthermore, the average plate thickness of the first slope portion 42*a* may be larger than the average plate thickness of the side plate 44 or may be smaller than the average plate thickness of the side plate 44.

(6) Furthermore, the main plate 42 has an outer peripheral end portion 42*c* that is placed at an outermost periphery of the main plate 42 on the outer side relative to the second slope portion 42*b* in the radial direction. An average plate thickness of the outer peripheral end portion 42*c* is smaller than the average plate thickness of the second slope portion 42*b*. Thus, in the main plate 42, which is inclined toward the other side in the axial direction FL as the main plate 42 approaches the outer side in the radial direction, by reducing the plate thickness of the outer peripheral end portion 42*c*, it is possible to limit the height of the fan 4, i.e., the length of the fan 4, which is axially measured from the end of the fan 4 facing the one side in the axial direction FL to the other end of the fan 4 facing the other side in the axial direction FL.

More specifically, a gradient of a slope of a surface of the outer peripheral end portion 42*c*, which faces the one side in the axial direction FL, is larger than a gradient of a slope of a surface of the outer peripheral end portion 42*c*, which faces the other side in the axial direction FL. Thus, the outer peripheral end portion 42*c* is tapered toward the outer side in the radial direction. For example, the surface of the outer peripheral end portion 42*c*, which faces the one side in the axial direction FL, may extend with a positive gradient toward the other side in the axial direction FL, and the surface of the outer peripheral end portion 42*c*, which faces the other side in the axial direction FL, may be set such that the position of this surface in the axial direction FL does not change as this surface approaches the outer side in the radial direction.

By progressively reducing the plate thickness of the outer peripheral end portion 42*c* toward the outer side in the radial direction, an excessive inclination of the surface of the outer peripheral end portion 42*c*, which faces the other side in the axial direction FL, toward the other side in the axial direction FL is limited. As another example, the position of the surface of the outer peripheral end portion 42*c*, which faces the other side in the axial direction, may progressively approaches the one side or the other side in the axial direction FL as the outer peripheral end portion 42*c* approaches the outer side in the radial direction.

Figure 2:
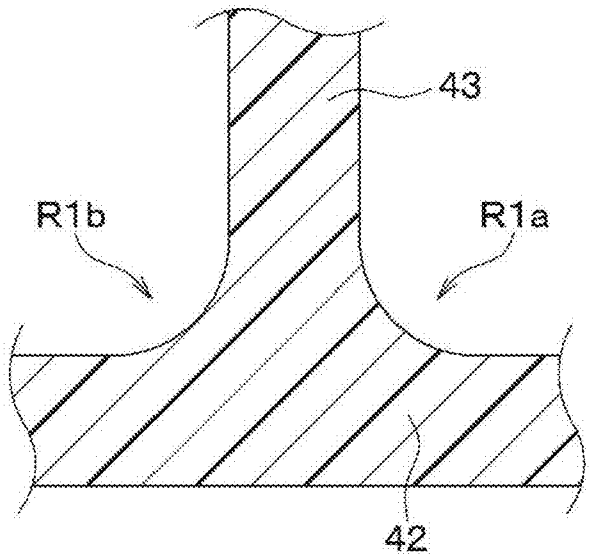
FIG. 2 is a cross-sectional view taken along line II-II in FIG. 1.
Figure 3:
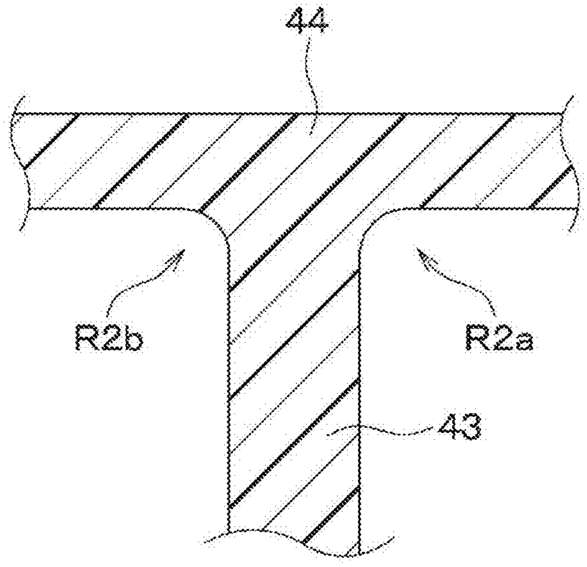
FIG. 3 is a cross-sectional view taken along line III-III in FIG. 1.

(7) Furthermore, as shown in FIG. 2, each corner R1*a*, R1*b* of a joint between each blade 43 and the main plate 42 is a rounded corner. Furthermore, as shown in FIG. 3, each corner R2*a*, R2*b* of a joint between each blade 43 and the side plate 44 is also a rounded corner. At each blade 43, a radius of curvature of the corner R1*a*, R1*b* is larger than a radius of curvature of the corner R2*a*, R2*b*. Here, it should be noted that the corner R2*a*, R2*b* may be a right-angled corner. Even in such a case, at each blade 43, a radius of curvature of a corner R1*a*, R1*b* is larger than a radius of curvature of a corner R2*a*, R2*b*.

More specifically, the comparison is made between an average radius of curvature of the corner R1*a*, R1*b* of the joint to the main plate 42 and an average radius of curvature of the corner R2*a*, R2*b* of the joint to the side plate 44. Here, the average radius of curvature of the corner R1*a*, R1*b* is obtained by averaging a radius of curvature at respective points arranged from an inner end of the corner R1*a*, R1*b* facing the inner side in the radial direction to an outer end of the corner R1*a*, R1*b* facing the outer side in the radial direction. Furthermore, the average radius of curvature of the corner R2*a*, R2*b* is obtained by averaging a radius of curvature at respective points arranged from an inner end of the corner R2*a*, R2*b* facing the inner side in the radial direction to an outer end of the corner R2*a*, R2*b* facing the outer side in the radial direction.

Therefore, at each blade 43, the joint to the main plate 42 is thicker than the joint to the side plate 44. By implementing the difference between the radius of curvature of the corner at the main plate side and the radius of curvature of the corner at the side plate side in the above-described manner, it is possible to reduce the amount of positional deviation measured between the motor support position 32*a* and the center G of gravity of the fan 4 in the axial direction of the output shaft 31.

All of the plurality of blades 43 or at least one (or more) of the plurality of blades 43 may be formed as the blade that has the above-described relationship among the corners R1*a*, R1*b*, R2*a*, R2*b*. When the above-described relationship is satisfied in the at least one blade 43 among the plurality of blades 43, the at least one blade 43 can implement the advantage described above.

Figure 4:
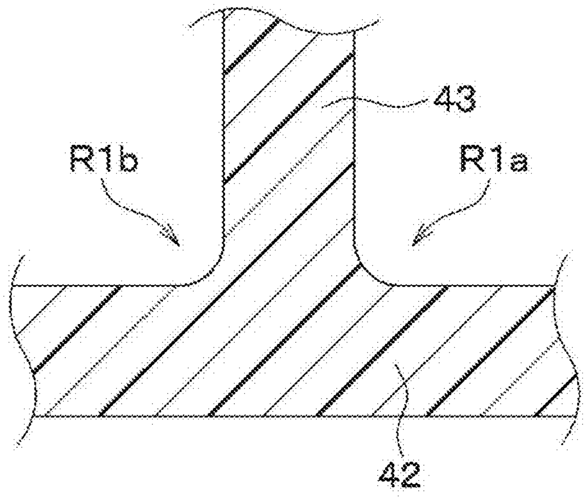
FIG. 4 is a cross-sectional view taken along line IV-IV in FIG. 1.

(8) Furthermore, as shown in FIGS. 2 and 4, the radius of curvature of each corner R1*a*, R2*a* of the joint between the at least one blade 43 and the main plate 42 is increased toward the outer side in the radial direction. This increase may be a progressive increase or a stepwise increase. The increase of the radius of curvature of each corner R1*a*, R2*a* toward the outer side in the radial direction described above may be only at a part of the joint between the blade 43 and the main plate 42 (e.g., only the joint between the blade 43 and the second slope portion 42*b*).

By implementing the change in the radius of curvature of the corner in the radial direction at the blade 43 in the above-described manner, it is possible to reduce the amount of positional deviation measured between the motor support position 32*a* and the center G of gravity of the fan 4 in the axial direction of the output shaft 31. This is because the main plate 42 is inclined toward the other side in the axial direction of the output shaft 31 as the main plate 42 approaches the outer side in the radial direction.

(9) Furthermore, as shown in FIG. 1, a leading edge 43*a*, which is an end portion facing the output shaft 31, of each of the plurality of blades 43 has one end portion that faces the one side in the axial direction FL, and the one end portion of the leading edge 43*a* is joined to a surface of the tubular portion 44*b* which faces the output shaft 31.

With this configuration, the rigidity of each blade 43 is improved, and thereby deformation of the fan 4 can be limited. This configuration may be implemented in all of the plurality of blades 43 as described above or at least one (or more) of the plurality of blades 43. Even in the latter case, the rigidity of the at least one (or more) of the plurality of blades 43 is improved.

In the present embodiment, the plate thickness of the rest of each blade 43, which is other than the joint to the main plate 42 and the joint to the side plate 44, is constant. Furthermore, the surface of the main plate 42 of the present embodiment, which faces the other side in the axial direction FL, does not have a projection(s), such as a rib(s).

Second Embodiment

Figure 5:
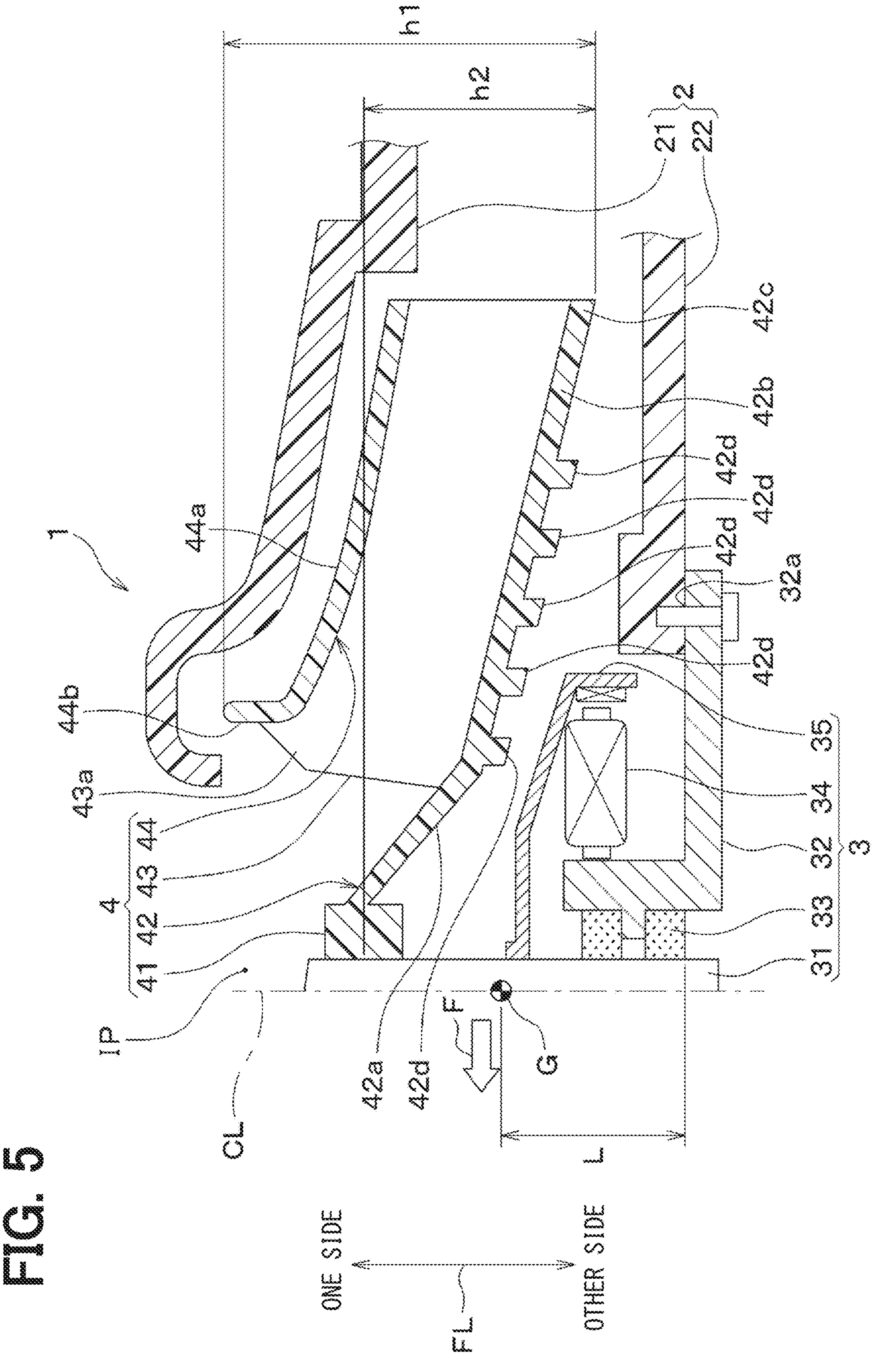
FIG. 5 is a cross-sectional view of a centrifugal blower of a second embodiment taken along a plane including a rotational axis of the centrifugal blower.
Figure 6:
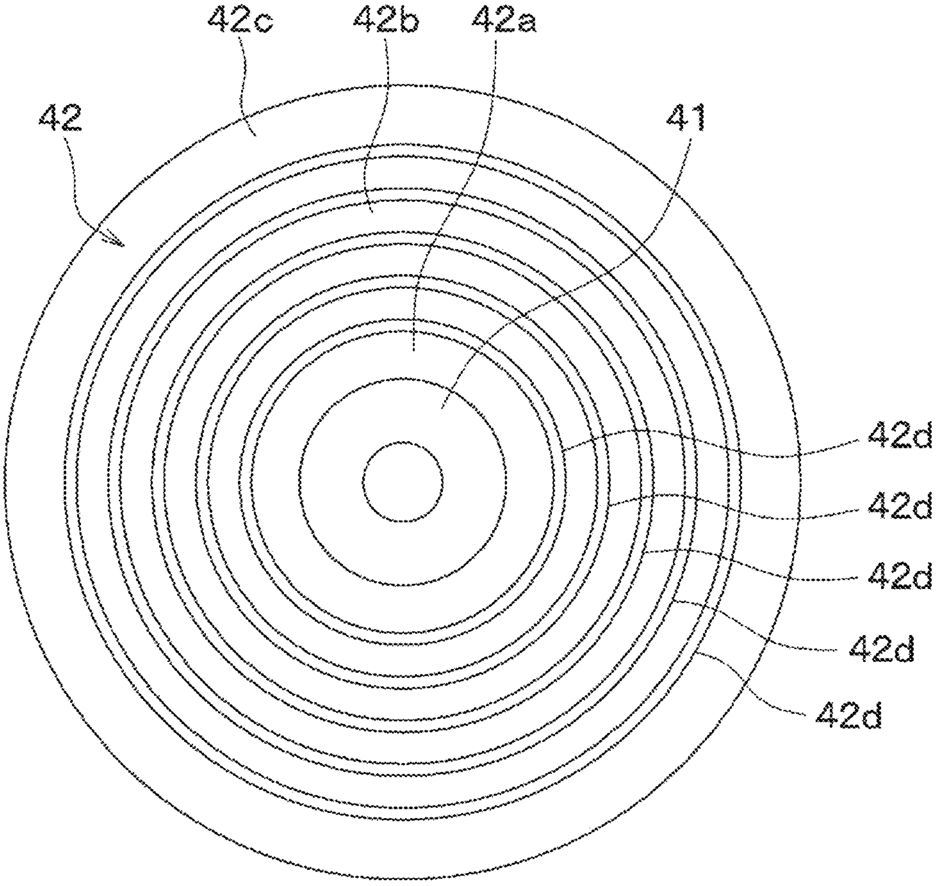
FIG. 6 is a plan view of a fan taken from the other side in an axial direction.

Next, a second embodiment will be described with reference to FIGS. 5 and 6. The centrifugal blower 1 of the present embodiment differs from the first embodiment in the configuration of the main plate 42. Specifically, as shown in FIGS. 5 and 6, the main plate 42 has a plurality of ribs 42*d*. Furthermore, although the plate thickness of the outer peripheral end portion 42*c* of the present embodiment is the same as the plate thickness of the second slope portion 42*b*, the plate thickness of the outer peripheral end portion 42*c* may be smaller than the plate thickness of the second slope portion 42*b* like in the first embodiment. The rest of the structure of the present embodiment is the same as that of the first embodiment.

The ribs 42*d* project toward the other side in the axial direction FL from the surface of the main plate 42 which is opposite to the side plate 44 in the axial direction FL. Each rib 42*d* is shaped in a ring form centered on the central axis of the output shaft 31 and surrounds the output shaft 31. These ribs 42*d* are arranged in an array from the inner side to the outer side in the radial direction as a whole. The number of the rib(s) 42*d* may be multiple (plurality) or one. Furthermore, the ribs 42*d* may be provided only to the second slope portion 42*b*, as indicated in FIGS. 5 and 6, or to both of the first slope portion 42*a* and the second slope portion 42*b*, or only to the first slope portion 42*a*.

Furthermore, in the present embodiment, an outermost portion of the main plate 42, which is outermost on the other side in the axial direction FL, is not one of the ribs 42*d*, but the end portion of the outer peripheral end portion 42*c*, which faces the other side in the axial direction FL. This reduces a possibility that the ribs 42*d* increase the dimension of the fan 4 measured in the axial direction FL.

(1) As described above, the main plate 42 has at least one rib 42*d* which projects toward the other side in the axial direction of the output shaft 31 from the surface of the main plate 42 that is opposite to the side plate 44. With this configuration, the amount L of positional deviation can be reduced by the amount that corresponds to the weight of the rib(s) 42*d*.

(2) Furthermore, each rib 42*d* is formed in the ring form that surrounds the output shaft 31. With this configuration, the rib 42*d* is less likely to form a resistance against the rotation of the fan 4. Furthermore, each rib 42*d* may be centered on the central axis of the output shaft 31 as described above, or may have a center that is displaced from the central axis of the output shaft 31. Furthermore, the ribs 42*d* may be formed only at the second slope portion 42*b* as shown in FIG. 6, or may be formed at both of the first slope portion 42*a* and the second slope portion 42*b*. Furthermore, the structure of the present embodiment, which is the same as or similar to the structure of the first embodiment, can achieve the advantage(s) that is similar to the advantage(s) of the structure of the first embodiment.

Third Embodiment

Figure 7:
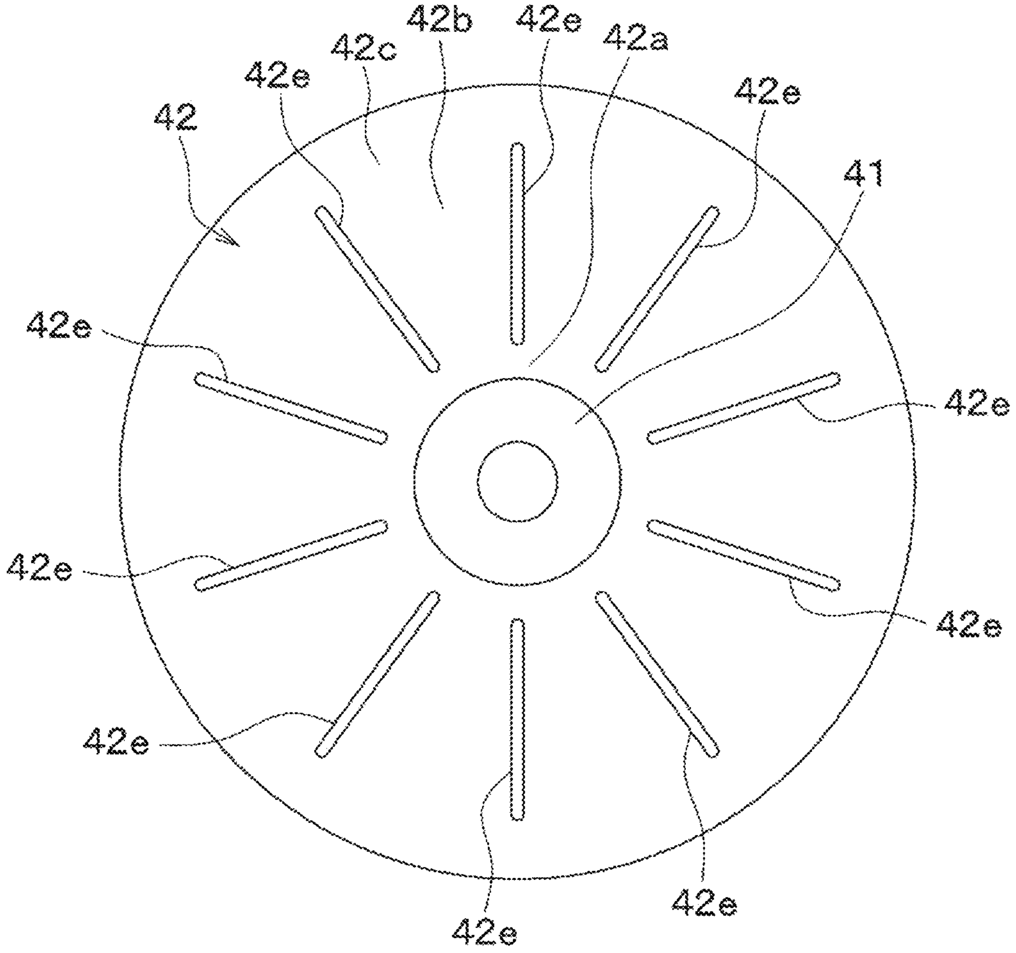
FIG. 7 is a plan view of a fan of a third embodiment taken from the other side in the axial direction.

Next, a third embodiment will be described with reference to FIG. 7. In the centrifugal blower 1 of the present embodiment, the plurality of ribs 42*d* of the second embodiment are replaced by a plurality of ribs 42*e*. The rest of the structure of the present embodiment is the same as that of the second embodiment. Each of the ribs 42*e* is shaped in a radiating form, which radiates with respect to the central axis of the output shaft 31 from the inner side toward the outer side in the radial direction.

Furthermore, in the present embodiment, an outermost portion of the main plate 42, which is outermost on the other side in the axial direction FL, is not one of the ribs 42*e*, but the end portion of the outer peripheral end portion 42*c*, which faces the other side in the axial direction FL.

The number of the rib(s) 42*e* may be multiple (plurality) or one. Furthermore, the ribs 42*e* may be provided only to the second slope portion 42*b*, as indicated in FIG. 7, or to both of the first slope portion 42*a* and the second slope portion 42*b*, or only to the first slope portion 42*a*.

Furthermore, in the present embodiment, one or plurality of ribs 42*d* shaped in a manner described in the second embodiment, may be additionally provided. Specifically, a combination of the rib(s) 42*d* and the rib(s) 42*e* may be formed at the main plate 42. Furthermore, the structure of the present embodiment, which is the same as or similar to the structure of any one or more of the first and second embodiments, can achieve the advantage(s) that is similar to the advantage(s) of the structure of the one or more of the first and second embodiments.

Fourth Embodiment

Figure 8:
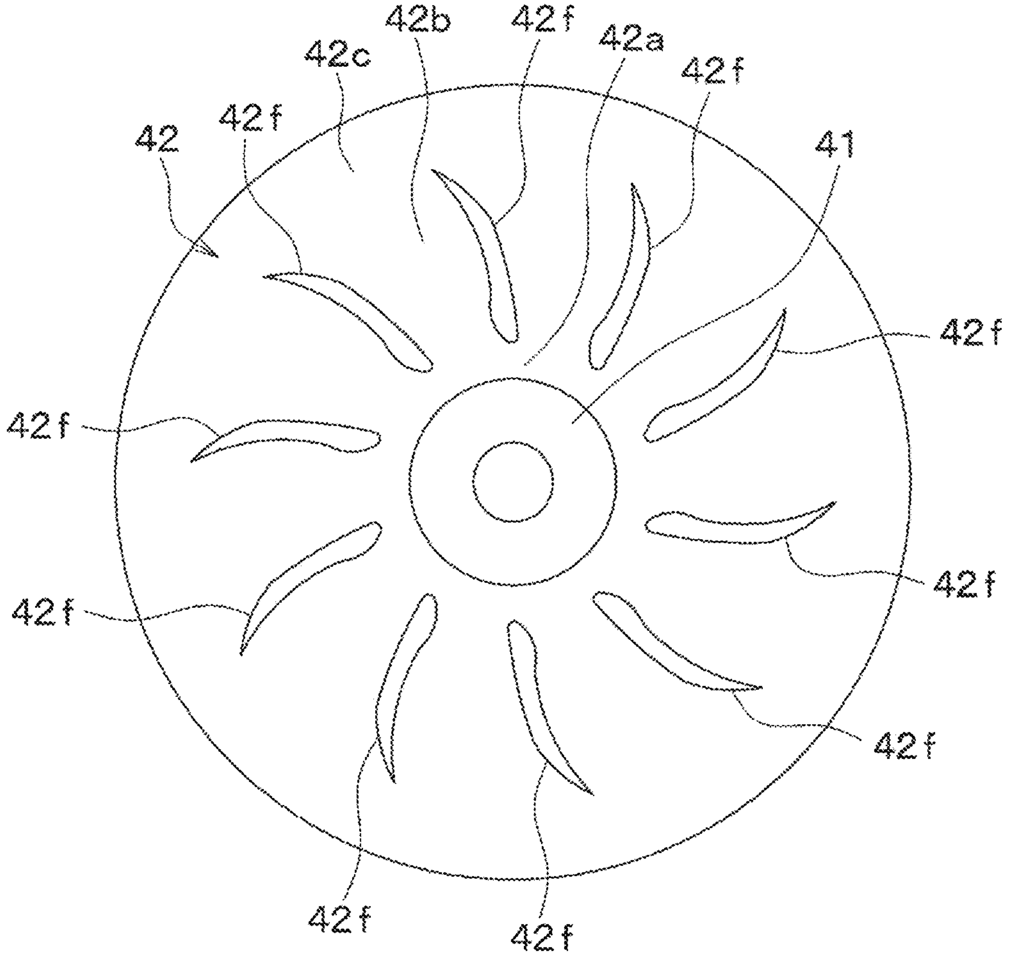
FIG. 8 is a plan view of a fan of a fourth embodiment taken from the other side in the axial direction.

Next, a fourth embodiment will be described with reference to FIG. 8. In the centrifugal blower 1 of the present embodiment, the plurality of ribs 42*e* of the third embodiment are replaced by a plurality of ribs 42*f*. The rest of the structure of the present embodiment is the same as that of the third embodiment.

The ribs 42*f* are arranged in the circumferential direction about the central axis of the output shaft 31. Furthermore, each of the ribs 42*f* is shaped in a wing form that extends such that the further away from the output shaft 31, the more the rib 42*f* is displaced toward the rear side in the rotational direction. That is, the orientation of each of the ribs 42*f* is the same as the orientation of each of the blades 43.

As another example, the orientation of each of the ribs 42*f* may be opposite to the orientation of each of the blades 43. Specifically, each of the ribs 42*f* may be shaped in another wing form that extends such that the further away from the output shaft 31, the more the rib 42*f* is displaced toward the front side in the rotational direction. Furthermore, the number of the ribs 42*f* may be the same as or different from the number of the blades 43. The number of the rib(s) 42*f* may be one.

Furthermore, in the present embodiment, an outermost portion of the main plate 42, which is outermost on the other side in the axial direction FL, is not one of the ribs 42*f*, but the end portion of the outer peripheral end portion 42*c*, which faces the other side in the axial direction FL.

The number of the rib(s) 42*f* may be multiple (plurality) or one. Furthermore, the ribs 42*f* may be provided only to the second slope portion 42*b*, as indicated in FIG. 8, or to both of the first slope portion 42*a* and the second slope portion 42*b*, or only to the first slope portion 42*a*. Furthermore, the structure of the present embodiment, which is the same as or similar to the structure of any one or more of the first to third embodiments, can achieve the advantage(s) that is similar to the advantage(s) of the structure of the one or more of the first to third embodiments.

Fifth Embodiment

Figure 9:
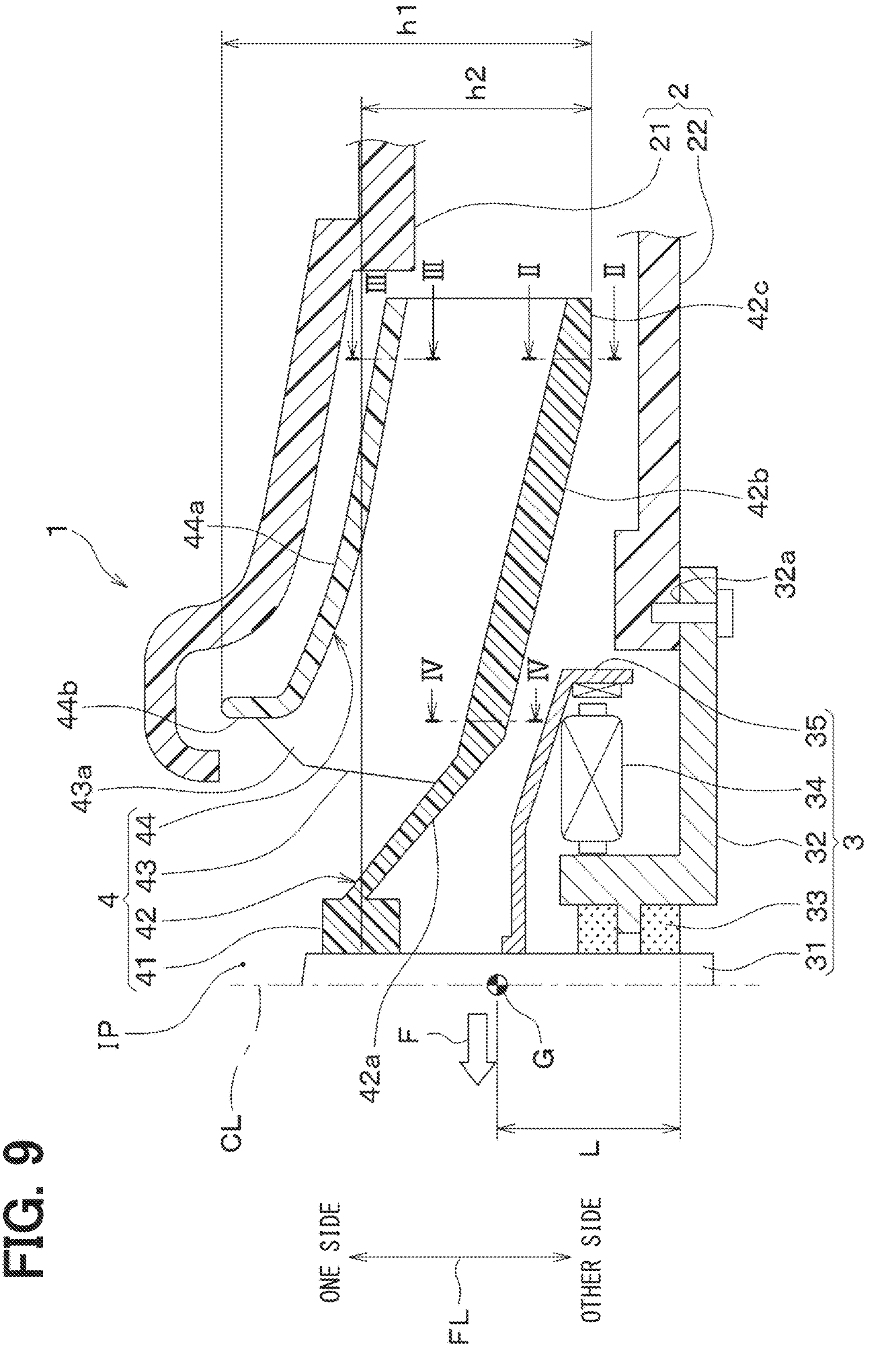
FIG. 9 is a cross-sectional view of a centrifugal blower of a fifth embodiment taken along a plane including a rotational axis of the centrifugal blower.

Next, a fifth embodiment will be described with reference to FIG. 9. The centrifugal blower 1 of the present embodiment differs from the first embodiment in the configuration of the boss 41 and the configuration of the main plate 42. The rest of the structure of the present embodiment is the same as that of the first embodiment. The modification as in the present embodiment can also be applied to any one of the second to fourth embodiments.

The boss 41 and the main plate 42 of the present embodiment are made of a material that has a mass density which is higher than a mass density of a material of the side plate 44, the blades 43 and the side plate 44. The material of the boss 41 and the main plate 42 may be resin or metal. In this way, the weight of the main plate 42 is increased in comparison to the third embodiment, and thereby the center G of gravity of the fan 4 is displaced toward the other side in the axial direction FL.

In the present embodiment, the boss 41 and the main plate 42 may be formed separately from the blades 43 and the side plate 44, and thereafter the blades 43 and the main plate 42 may be joined together by, for example, welding to form the fan 4. Alternatively, the boss 41 and the main plate 42 may be formed together with the blades 43 and the side plate 44 by a two-color injection molding process.

The boss 41 may be formed by the material that is the same as the material of the blades 43 and the side plate 44 like in the first embodiment. Alternatively, the blades 43 may be made of the material that is the same as the material of the main plate 42. In any one of these cases, the advantage, which is similar to the above described one, can be achieved.

(1) As described above, the main plate 42 is made of the material that has the mass density which is higher than the mass density of the material of the side plate 44. In this way, by making the material of the main plate 42 and the material of the side plate 44 different from each other in the above-described manner, the amount L of positional deviation can be reduced. Furthermore, the structure of the present embodiment, which is the same as or similar to the structure of any one or more of the first to fourth embodiments, can achieve the advantage(s) that is similar to the advantage(s) of the structure of the one or more of the first to fourth embodiments.

Sixth Embodiment

Figure 10:
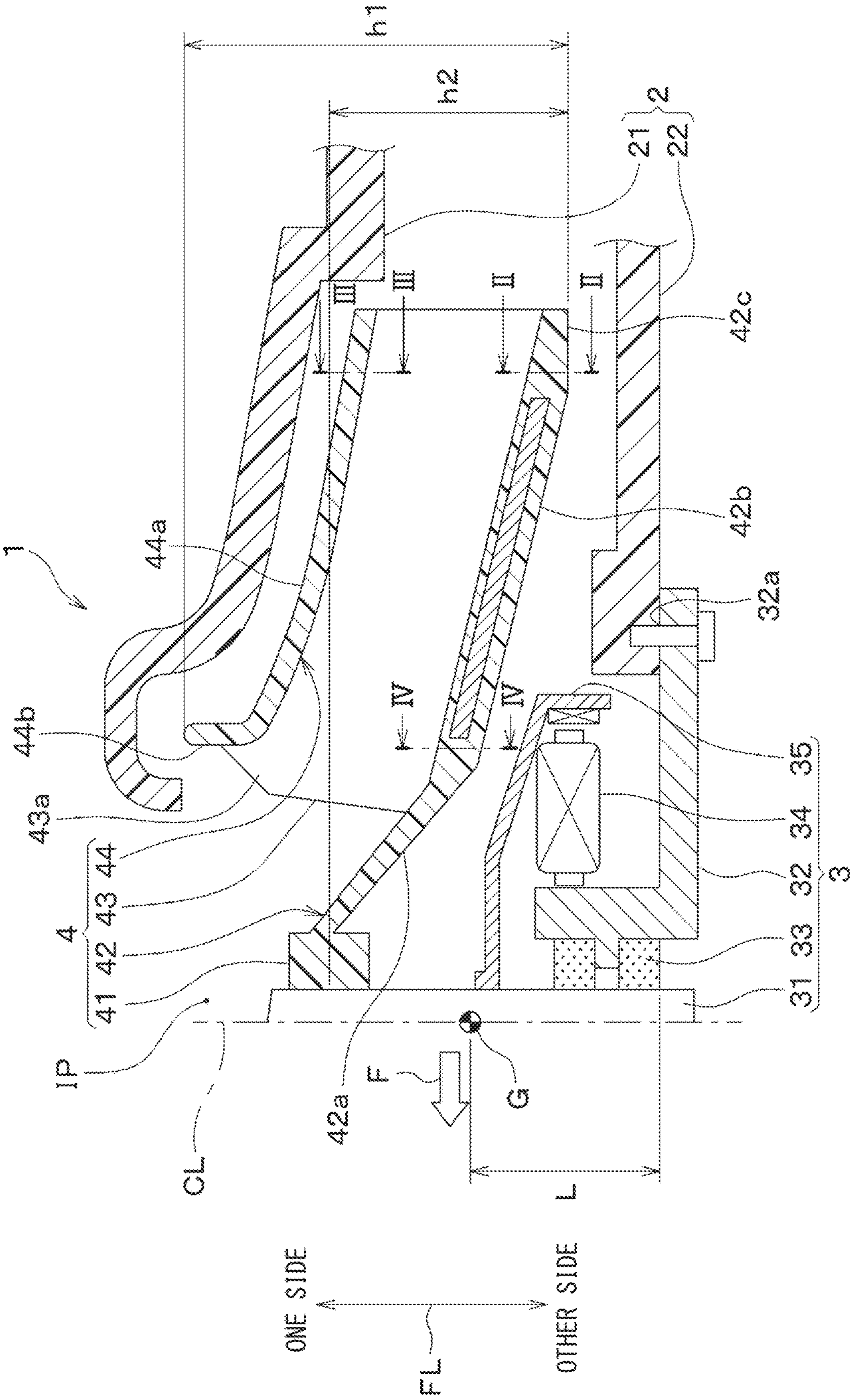
FIG. 10 is a cross-sectional view of a centrifugal blower of a sixth embodiment taken along a plane including a rotational axis of the centrifugal blower.

Next, a sixth embodiment will be described with reference to FIG. 10. The centrifugal blower 1 of the present embodiment differs from the first embodiment in the material of the fan 4. The rest of the structure of the present embodiment is the same as that of the first embodiment. The modification as in the present embodiment can also be applied to any one of the second to fifth embodiments.

In the present embodiment, other than the main plate 42, the remaining components of the fan 4, such as the boss 41, the blades 43 and the side plate 44, are all made of resin. In the main plate 42, as shown in FIG. 10, the first slope portion 42*a* and the outer peripheral end portion 42*c* are made of the resin. The second slope portion 42*b* includes: a metal portion, which is made of metal; and a resin portion, which is made of resin and surrounds the metal portion. This metal has a mass density that is higher than a mass density of the resin described above. Therefore, the mass density of the main plate 42 is higher than the mass density of the side plate 44.

The fan 4 having the structure described above can be manufactured by a resin molding process, in which the metal is inserted into the resin, i.e., by an insert molding process. Like the second slope portion 42*b*, the first slope portion 42*a* and the outer peripheral end portion 42*c* may be partially made of metal.

(1) As described above, the second slope portion 42*b* includes: the metal portion; and the resin portion which surrounds the metal portion. By increasing the weight of the main plate in the above-described manner, the amount L of positional deviation can be reduced. Furthermore, the structure of the present embodiment, which is the same as or similar to any one or more of the first to fifth embodiments, can achieve the advantage(s) that is similar to the advantage (s) of the one or more of the first to fifth embodiments.

Seventh Embodiment

Figure 11:
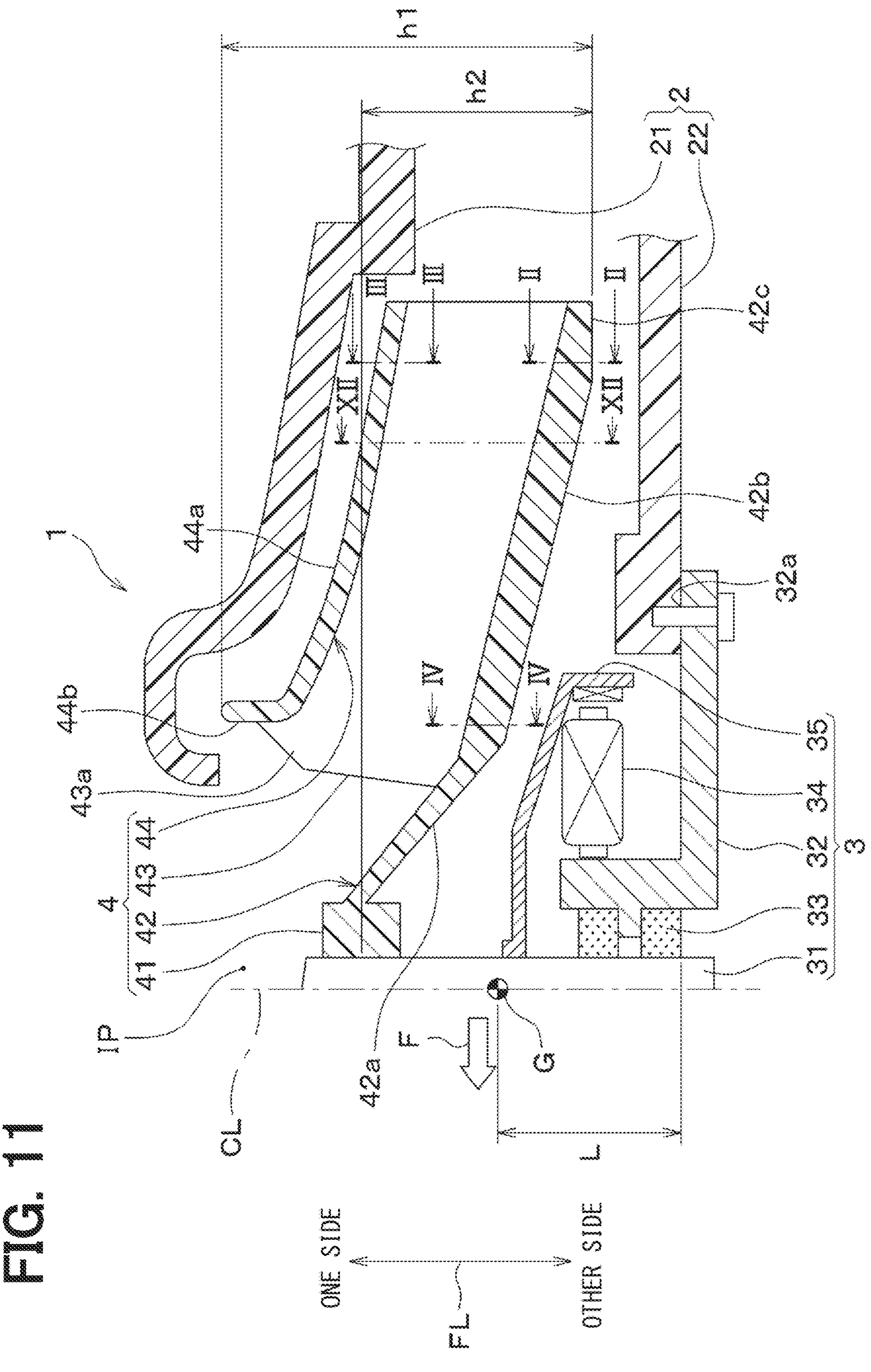
FIG. 11 is a cross-sectional view of a centrifugal blower of a seventh embodiment taken along a plane including a rotational axis of the centrifugal blower.
Figure 12:
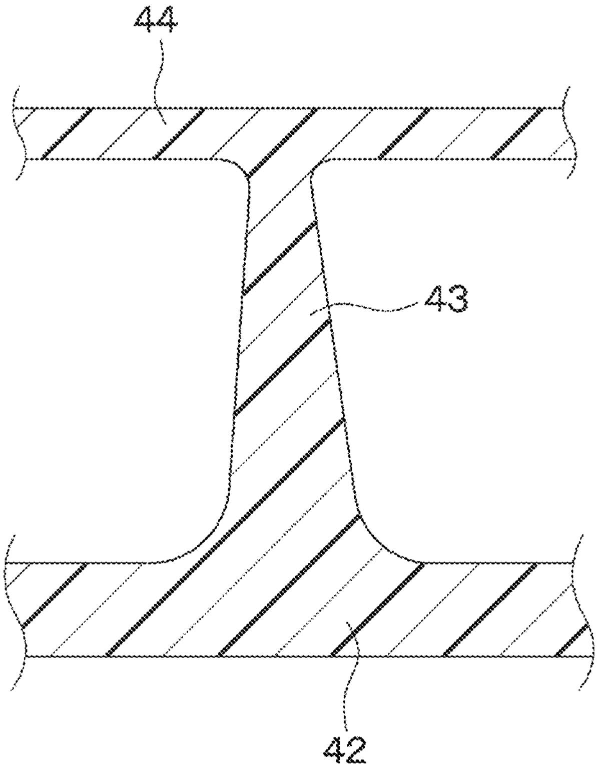
FIG. 12 is a cross-sectional view taken along line XII-XII in FIG. 11.

Next, a seventh embodiment will be described with reference to FIGS. 11 and 12. The centrifugal blower 1 of the present embodiment differs from the first embodiment in the configuration of the blades 43. The rest of the structure of the present embodiment is the same as that of the first embodiment. The modification as in the present embodiment can also be applied to any one of the second to sixth embodiments.

Each of the blades 43 of the present embodiment satisfies that a plate thickness of a portion of the blade 43, which is closer to the main plate 42 than to the side plate 44, is larger than a plate thickness of another portion of the blade 43, which is closer to the side plate 44 than to the main plate 42. Specifically, as shown in FIG. 12, a plate thickness of a main body of each blade 43, which is other than the joint to the main plate 42 and the joint to the side plate 44, is progressively reduced as the main body is spaced away from the main plate 42 and approaches the side plate 44. Besides the above-described configuration, in which the plate thickness of the main body of the blade 43 is progressively reduced as the main body is spaced away from the main plate 42 and approaches the side plate 44, the plate thickness of the main body may be reduced in a stepwise manner.

(1) As described above, each of the blades 43 satisfies that the plate thickness of the portion of the blade 43, which is closer to the main plate 42, is larger than the plate thickness of the other portion of the blade 43, which is closer to the side plate 44. By differently setting the plate thickness between the portion of the blade 43, which is closer to the main plate 42, and the other portion of the blade 43, which is closer to the side plate 44, in the above-described manner, the amount L of positional deviation can be reduced.

Instead of all of the plurality of blades 43, only one or more of the plurality of blades 43 may be formed as the blade 43 having the characteristics described above. That is, the advantage(s) described above can be achieved to a certain extent(s) as long as the one or more of the blades 43 having the characteristics described above are provided.

Other Embodiments

The present disclosure is not limited to the above embodiments, and the above embodiments may be appropriately modified. Further, the above embodiments are not unrelated to each other and can be appropriately combined unless the combination is clearly impossible. Furthermore, in each of the embodiments described above, the elements of the embodiment are not necessarily essential except when it is clearly indicated that they are essential and when they are clearly considered to be essential in principle. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. Furthermore, when multiple values are illustrated for a given quantity, it is also possible to adopt a value between those multiple values, except when specifically noted otherwise and when clearly impossible in principle. In each of the above embodiments, when the shape, the positional relationship or the like of the constituent elements of the embodiment are mentioned, the present disclosure should not be limited the shape, the positional relationship or the like unless it is clearly stated that it is essential and/or it is required in principle. Furthermore, the present disclosure also permits the following variations and variations of equivalent scope to each of the above present embodiments. Application and non-application of the following variations to the embodiments described above can be independently selected. In other words, any combination of the following variations can be applied to the embodiments described above.

What is claimed is:

1. A centrifugal blower comprising:

a case;

an electric motor that is supported by the case at a motor support position of the electric motor; and a fan that is configured to be driven and rotated by the electric motor, wherein:

the fan includes:

a boss that is installed to an output shaft of the electric motor at a location which is on one side relative to the motor support position in an axial direction of the output shaft;

a main plate that extends outward from the boss in a radial direction of a central axis of the output shaft;

a plurality of blades that extend from the main plate toward the one side in the axial direction of the output shaft; and a side plate that is joined to an end portion of each of the plurality of blades which faces the one side in the axial direction of the output shaft, wherein:

a weight of the main plate is larger than a weight of the side plate;

the main plate and the side plate are both inclined toward another side opposite to the one side in the axial direction of the output shaft as the main plate and the side plate approach an outer side in the radial direction;

the main plate has:

a first slope portion that has a gradient of an inclination that is inclined toward the another side in the axial direction of the output shaft as the first slope portion approaches the outer side in the radial direction, wherein the gradient of the inclination of the first slope portion is within a first range; and a second slope portion that is placed on the outer side relative to the first slope portion in the radial direction and has a gradient of an inclination which is inclined toward the another side in the axial direction of the output shaft as the second slope portion approaches the outer side in the radial direction, wherein the gradient of the inclination of the second slope portion is within a second range that is different from the first range;

a plate thickness of the second slope portion is larger than a plate thickness of the first slope portion; and the electric motor includes:

a rotor that is coupled to the output shaft to rotate together with the output shaft; and a stator that is radially opposed to the rotor, wherein the stator includes a core having an axial end portion facing toward the boss in the axial direction, and an axial end portion of the second slope portion, which is opposite to the boss in the axial direction, is axially positioned further away from the boss than the axial end portion of the core, so that a center of gravity of the fan is placed closer to the electric motor than to the boss.

2. The centrifugal blower according to claim 1, wherein a plate thickness of the main plate is larger than a plate thickness of the side plate.

3. The centrifugal blower according to claim 1, wherein a length, which is axially measured from a position of a connection between the boss and the output shaft to an end of the fan facing the another side in the axial direction of the output shaft, is equal to or larger than one half of a length, which is axially measured from another end of the fan facing the one side in the axial direction of the output shaft to the end of the fan facing the another side in the axial direction of the output shaft.

4. The centrifugal blower according to claim 1, wherein the first range is steeper than the second range.

5. The centrifugal blower according to claim 1, wherein:
- the main plate has an outer peripheral end portion that is placed at an outermost periphery of the main plate on the outer side relative to the second slope portion in the radial direction; and
- a plate thickness of the outer peripheral end portion is smaller than a plate thickness of the second slope portion.

6. The centrifugal blower according to claim 1, wherein:
- the side plate is made of resin; and
- the second slope portion includes a metal portion, which is made of metal, and a resin portion, which is made of resin and surrounds the metal portion.

7. The centrifugal blower according to claim 1, wherein at least one blade among the plurality of blades satisfies that a radius of curvature of a corner at a joint between the at least one blade and the main plate is larger than a radius of curvature of a corner at a joint between the at least one blade and the side plate.

8. The centrifugal blower according to claim 7, wherein the radius of curvature of the corner at the joint between the at least one blade and the main plate is increased toward the outer side in the radial direction.

9. The centrifugal blower according to claim 1, wherein at least one blade among the plurality of blades satisfies that a plate thickness of a portion of the at least one blade, which is closer to the main plate than to the side plate, is larger than a plate thickness of another portion of the at least one blade, which is closer to the side plate than to the main plate.

10. The centrifugal blower according to claim 1, wherein the main plate has at least one rib that projects from a surface of the main plate, which is opposite to the side plate, toward the another side in the axial direction of the output shaft.

11. The centrifugal blower according to claim 10, wherein the at least one rib is shaped in a radiating form, which radiates with respect to the central axis of the output shaft, or a ring form, which surrounds the output shaft, or a combination of the radiating form and the ring form.

12. The centrifugal blower according to claim 10, wherein the at least one rib is shaped in a wing form.

13. The centrifugal blower according to claim 1, wherein the main plate is made of a material that has a mass density which is higher than a mass density of a material of the side plate.

14. The centrifugal blower according to claim 1, wherein:
- the side plate has a tubular portion that surrounds the output shaft and forms a suction port; and
- a leading edge, which is an end portion facing the output shaft, of at least one or all of the plurality of blades has one end portion that faces the one side in the axial direction of the output shaft, wherein on the one side in the axial direction relative to an end of the tubular portion facing the another side in the axial direction of the output shaft, the one end portion of the leading edge is joined to a surface of the tubular portion which faces the output shaft.

15. The centrifugal blower according to claim 1, wherein:
- the core is placed on a radially inner side of the rotor and is exposed to a space where the main plate is disposed; and
- the center of gravity of the fan is located adjacent to the rotor.

16. A centrifugal blower comprising:
- a case;
- an electric motor that is supported by the case at a motor support position of the electric motor; and
- a fan that is configured to be driven and rotated by the electric motor, wherein:
- the fan includes:
  - a boss that is installed to an output shaft of the electric motor at a location which is on one side relative to the motor support position in an axial direction of the output shaft;
  - a main plate that extends outward from the boss in a radial direction of a central axis of the output shaft;
  - a plurality of blades that extend from the main plate toward the one side in the axial direction of the output shaft; and
  - a side plate that is joined to an end portion of each of the plurality of blades which faces the one side in the axial direction of the output shaft;
- a weight of the main plate is larger than a weight of the side plate;
- the main plate and the side plate are both inclined toward another side opposite to the one side in the axial direction of the output shaft as the main plate and the side plate approach an outer side in the radial direction;
- the main plate has:
  - a first slope portion that has a gradient of an inclination that is inclined toward the another side in the axial direction of the output shaft as the first slope portion approaches the outer side in the radial direction, wherein the gradient of the inclination of the first slope portion is within a first range; and
  - a second slope portion that is placed on the outer side relative to the first slope portion in the radial direction and has a gradient of an inclination which is inclined toward the another side in the axial direction of the output shaft as the second slope portion approaches the outer side in the radial direction, wherein the gradient of the inclination of the second slope portion is within a second range that is different from the first range;
- the main plate has an outer peripheral end portion that is placed at an outermost periphery of the main plate on the outer side relative to the second slope portion in the radial direction; and
- a plate thickness of the outer peripheral end portion is smaller than a plate thickness of the second slope portion.

* * * * *